United States Patent
Laigle et al.

(10) Patent No.: US 11,767,781 B2
(45) Date of Patent: Sep. 26, 2023

(54) LNT REGENERATION WITH HYDROGEN FOR TRANSPORT ENGINE APPLICATION

(71) Applicant: SAUDI ARABIAN OIL COMPANY, Dhahran (SA)

(72) Inventors: Emmanuel Laigle, Courbevoie (FR); Christophe Chaillou, Rueil-Malmaison (FR); Caroline Norsic, Rueil-Malmaison (FR); André Nicolle, Nanterre (FR)

(73) Assignee: SAUDI ARABIAN OIL COMPANY, Dhahran (SA)

( * ) Notice: Subject to any disclaimer, the term of this patent is extended or adjusted under 35 U.S.C. 154(b) by 0 days.

(21) Appl. No.: 17/651,687

(22) Filed: Feb. 18, 2022

(65) Prior Publication Data

US 2023/0265773 A1    Aug. 24, 2023

(51) Int. Cl.
*F01N 3/20*    (2006.01)
*F01N 3/10*    (2006.01)
(Continued)

(52) U.S. Cl.
CPC .......... *F01N 3/206* (2013.01); *B01D 53/265* (2013.01); *B01D 53/944* (2013.01);
(Continued)

(58) Field of Classification Search
CPC .................................................. F01N 2610/04
See application file for complete search history.

(56) References Cited

U.S. PATENT DOCUMENTS

| 7,293,409 B2 * | 11/2007 | Sellnau | F01N 13/0097 60/303 |
| 2004/0098977 A1 * | 5/2004 | Kupe | F01N 3/035 60/297 |

(Continued)

FOREIGN PATENT DOCUMENTS

| CN | 112943418 A | 6/2021 |
| EP | 2562375 A2 | 2/2013 |
| WO | 2018185660 A1 | 10/2018 |

OTHER PUBLICATIONS

Ml. Mauss and W. Wnuck; "Diesel Reformers For Lean Nox Trap Regeneration And Other On-Board Hydrogen Applications", Office of Scientific & Technical Information Technical Reports; UNT Libraries; Aug. 24, 2003; pp. 1-9 (9 pages).

(Continued)

*Primary Examiner* — Jonathan R Matthias
(74) *Attorney, Agent, or Firm* — Osha Bergman Watanabe & Burton LLP

(57) ABSTRACT

An exhaust treatment system includes an exhaust line, a series of emission treatment units, and an electronic control unit. The series of emission treatment units includes a catalytic unit, a particulate filter unit, an oxidation catalytic unit, a hydrogen injection unit, and a Lean NOx Trap (LNT) for trapping select emissions. A method of operating an exhaust treatment system includes introducing a fuel to a combustion engine of a motor vehicle, directing emissions from the combustion engine to an exhaust line, and passing the emissions in the exhaust line through a series of emission treatment units on the exhaust line. The method further includes injecting hydrogen into the exhaust line via a hydrogen injection unit, where an amount of hydrogen gas injected from a hydrogen inlet line reduces the trapped emissions in the LNT to an inert gas.

20 Claims, 5 Drawing Sheets

(51) Int. Cl.
    *B01D 53/94*       (2006.01)
    *B01D 53/26*       (2006.01)
    *C25B 1/04*        (2021.01)
    *F01N 3/00*        (2006.01)
    *F01N 3/08*        (2006.01)

(52) U.S. Cl.
    CPC ..... *B01D 53/9431* (2013.01); *B01D 53/9477* (2013.01); *B01D 53/9495* (2013.01); *C25B 1/04* (2013.01); *F01N 3/005* (2013.01); *F01N 3/0871* (2013.01); *F01N 3/0885* (2013.01); *F01N 3/103* (2013.01); *B01D 2255/904* (2013.01); *B01D 2279/30* (2013.01); *F01N 2610/04* (2013.01); *F01N 2610/1453* (2013.01)

(56) References Cited

U.S. PATENT DOCUMENTS

2010/0287911 A1* 11/2010 Katsuki ............... F02D 41/1447
                                                              60/287
2011/0131952 A1*  6/2011 Onodera ............... F01N 3/0871
                                                              60/285
2020/0032688 A1   1/2020 Sung et al.

OTHER PUBLICATIONS

International Search Report and Written Opinion Issued in Corresponding Application No. PCT/US2023/013305, dated Apr. 21, 2023, 11 pages.

\* cited by examiner

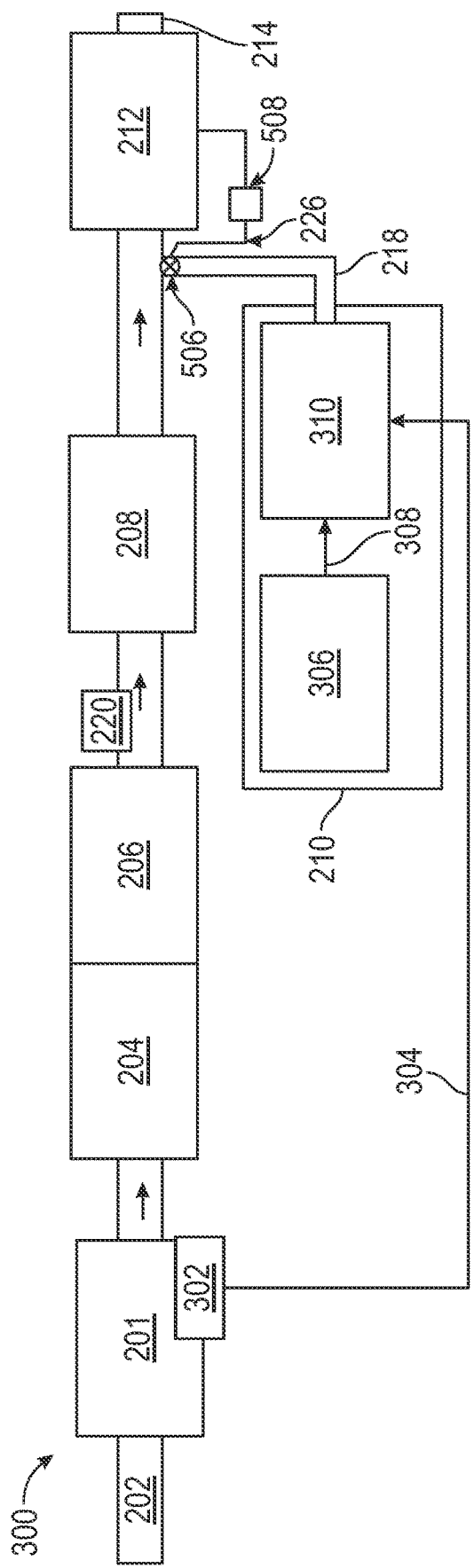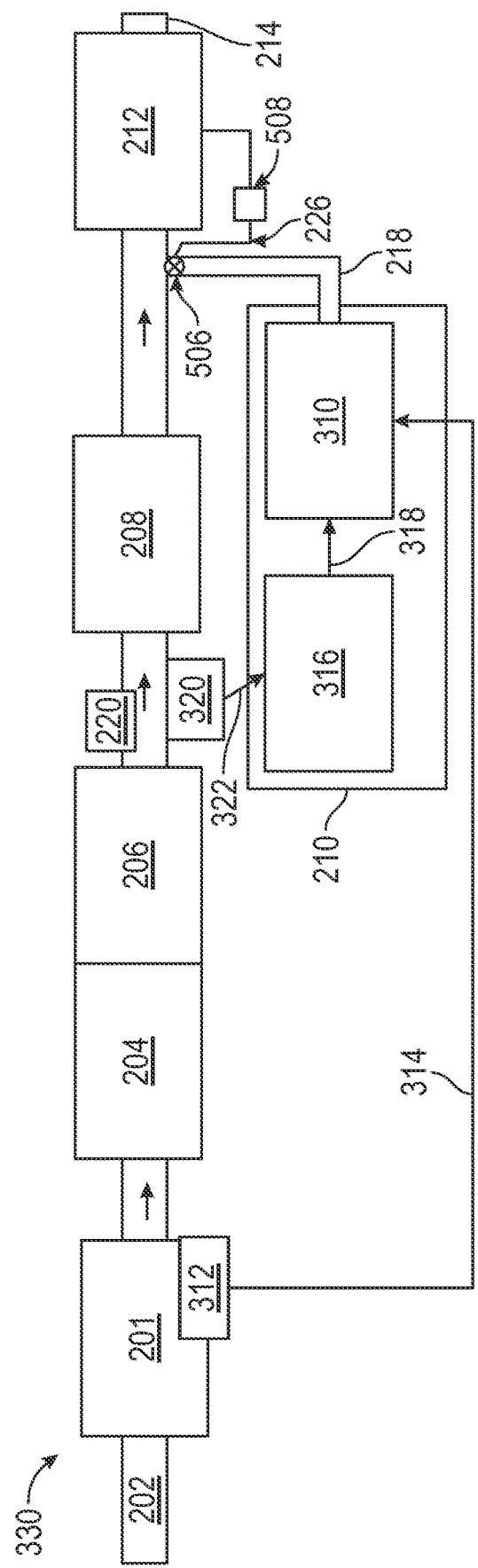

LNT REGENERATION WITH HYDROGEN FOR TRANSPORT ENGINE APPLICATION

BACKGROUND

Environmental concerns and government regulations have led to efforts to improve the removal of noxious combustion by-products and exhaust pollutants from vehicle engine exhaust gases. Thus, reduction of these exhaust pollutants from exhaust gases is desirable. These exhaust gases generally contain several components including carbon monoxide (CO), unburned hydrocarbons (HCs) or nitrogen oxides ($NO_x$). Exhaust lines commonly incorporate several components in order to reduce pollutants from a high concentration of such pollutants at the engine level to lower concentrations at the tailpipe. For example, one or more catalysts may be included to treat gaseous pollutants such as CO, unburned hydrocarbons, or $NO_x$. Additionally, particulate filters may be introduced to store solid pollutants, also known as soots or particulate matter.

As shown in FIG. 1, an example of a conventional engine system 100 may include an internal combustion engine 102 such as a compression ignition diesel engine coupled to an exhaust particulate filter system 106. Exhaust particulate filter system 106 includes an exhaust particulate filter 108 fluidly connected with engine 100 to trap particulates such as soot and ash in engine exhaust. Filter 108 may include a canister or housing 110 having an exhaust inlet 112 fluidly connected with an exhaust conduit 114 coupled with engine 100 in a conventional manner, and an exhaust outlet 116 coupled with an outlet conduit 118, in turn connecting with an exhaust stack or tailpipe (not shown) in a conventional manner. A regeneration mechanism 120 is positioned fluidly between engine 100 and filter 108 to enable regeneration of filter 108. A diesel oxidation catalyst (not shown) may also be located fluidly between engine 100 and filter 108. A filter medium 122 is positioned within housing 110 and configured for trapping particulates such as soot and ash in exhaust from engine 100. Filter system 106 may further include a control system 126 for filter 108.

However, a large part of the total $NO_x$, CO, and hydrocarbon emissions are emitted during the cold start phase because most emission control catalysts reach a high level of pollutant conversion at their operationally warm state. As such, catalysts are often heated during the cold start phase in order for them to reach the operating temperatures required for conversion of the hydrocarbons to increase pollutant conversion and reduce emissions during the cold start phase. However, under cold start conditions, residual pollutants may remain.

To further mitigate emissions, an additional catalytic system, such as a Lean $NO_x$ Trap (LNT), may be included in an exhaust gas treatment system in fluid connection after the particulate filter. When an engine is operating under an excess of oxygen, NO is oxidized to $NO_2$, which is then stored in the form of nitrates in the LNT. This storage of $NO_x$ is followed by a passage of an oxygen poor flow, and stored $NO_x$ emissions are then reduced and removed as nitrogen gas, and LNT is regenerated.

SUMMARY

This summary is provided to introduce a selection of concepts that are further described below in the detailed description. This summary is not intended to identify key or essential features of the claimed subject matter, nor is it intended to be used as an aid in limiting the scope of the claimed subject matter.

In one aspect, embodiments disclosed herein relate to an exhaust treatment system including an exhaust line, a series of emission treatment units in the exhaust line, an electronic control unit, wherein the electronic control unit is in electrical communication with at least one emission treatment unit, and at least one sensor coupled to the exhaust line upstream of the LNT, downstream of the LNT, or combinations thereof.

The series of emission treatment units may include a catalytic unit downstream of an engine, a particulate filter unit downstream of the catalytic unit, an oxidation catalytic unit downstream of the particulate filter unit, a hydrogen injection unit downstream of the oxidation catalytic unit, and a Lean NOx Trap (LNT) for trapping at least one gaseous emission downstream of the hydrogen injection unit.

In another aspect, embodiments disclosed herein relate to a method of operating an exhaust treatment system that includes introducing a fuel to a combustion engine of a motor vehicle, directing emissions from the combustion engine to an exhaust line, passing the emissions in the exhaust line through a catalytic unit, a particulate filter, and an oxidation catalytic unit, storing the emissions in a Lean $NO_x$ Trap (LNT), wherein the LNT is positioned downstream of the oxidation catalytic unit, injecting hydrogen into the exhaust line via a hydrogen injection unit, wherein an amount of hydrogen gas injected from a hydrogen inlet line reduces the trapped NOx emissions in the LNT to an inert gas, wherein the inert gas is nitrogen, and passing the emissions and the hydrogen through the LNT.

Other aspects and advantages of the claimed subject matter will be apparent from the following description and the appended claims.

BRIEF DESCRIPTION OF DRAWINGS

FIGS. 3A and 3B are schematics of the hydrogen injection unit with water-based hydrogen sources in accordance with one or more embodiments.

DETAILED DESCRIPTION

Embodiments in accordance with the present disclosure generally relate to systems and methods for reducing the content of residual pollutants, such as nitrogen oxide (NO), nitrogen dioxide ($NO_2$), and combinations thereof, from tailpipe emissions in an exhaust line. Accordingly, the reduction of residual pollutants from an exhaust gas is desirable. The systems of the present disclosure are not limited and are applicable to any engine exhaust, including emissions from diesel, gasoline, and natural gas engines. The systems may also be used in the exhaust line of any vehicle including any conventional or hybrid vehicles.

Additionally, embodiments in accordance with the present disclosure relate to systems and methods for regeneration of a catalyst to increase pollutant conversion and reduce $NO_x$ emissions. Embodiments disclosed herein further provide means for introducing hydrogen gas into an exhaust treatment system of a vehicle. More specifically, embodiments disclosed herein relate to systems and methods for regeneration of a catalyst, such as a Lean $NO_x$ Trap via injecting a hydrogen gas into an exhaust line of a transport engine.

Figure 1:
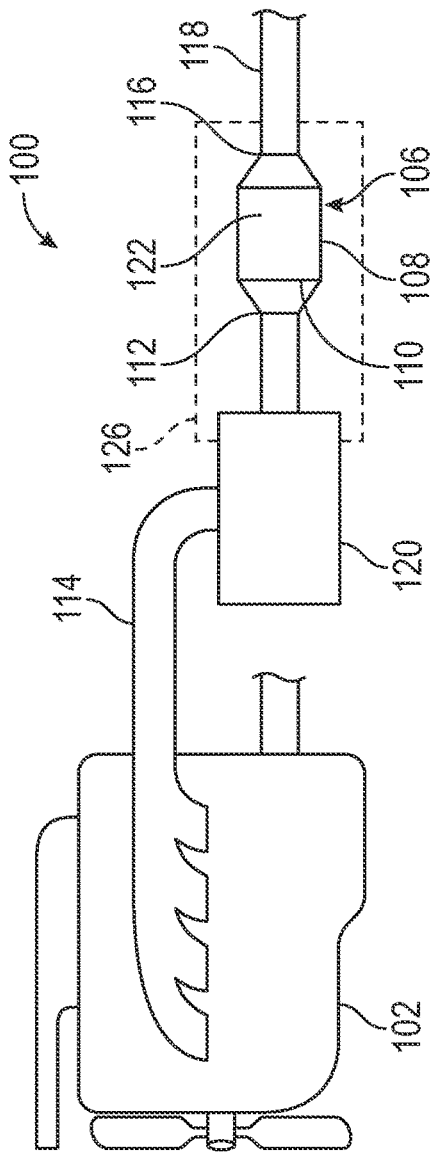
FIG. 1 is a schematic of a conventional engine system.
Figure 2:
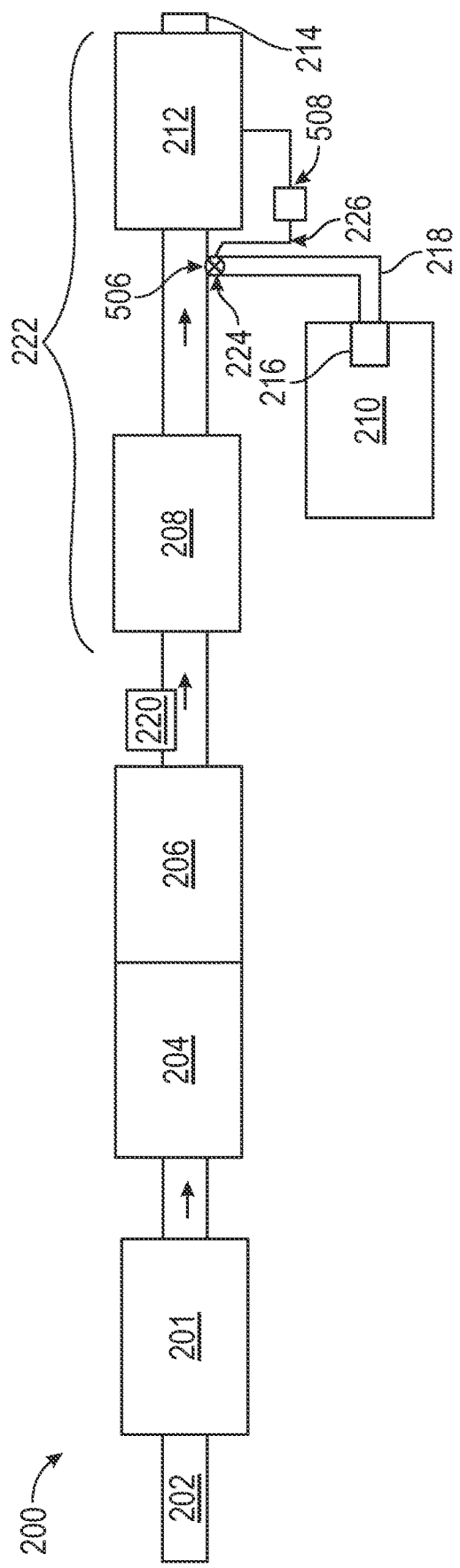
FIG. 2 is a schematic of an exhaust treatment system in accordance with one or more embodiments.

As illustrated in FIG. 2, an exhaust treatment system 200 of a transport engine according to embodiments of the present disclosure may include a consecutive collection of treatment units such as an exhaust line 202 from an engine 201, a catalytic unit 204 for reducing gaseous pollutants, a particulate filter 206 for reducing solid pollutants, an oxidation catalyst 208, a hydrogen injection unit 210, and a Lean NOx Trap (LNT) 212 are included on the exhaust line 202. Further, the exhaust treatment system 200 may include a sensor 220 in the exhaust line downstream of the particulate filter 206. In such embodiments, the sensor 220 may detect localized temperatures of at least one unit of the exhaust treatment system 200.

The engine 201 may release emissions from the combustion of a fuel. The exhaust line 202 may transport emissions from the engine 201 to subsequent treatment units included downstream on the exhaust line 202. The catalytic unit 204, such as a catalytic converter, may be included on the exhaust line 202 downstream of the engine 201 and proximate to the engine 201. In such embodiments, the catalytic unit 204 may be in fluid communication with the engine 201. As one skilled in the art may appreciate, the catalytic unit 204 may catalyze a reaction, such as a redox reaction, of the emissions from the engine 201. The catalytic unit 204 may be upstream of the particulate filter 206 on the exhaust line 202, such that the catalytic unit 204 is in fluid communication with the particulate filter 206. The particulate filter 206 of the exhaust line 202 may trap particulates, such as soot and ash, in the emissions from the engine 201.

An engine electronic control unit (ECU) 508 may be included in the exhaust treatment system 200. As one skilled of the art may appreciate, the ECU 508 may be in electrical communication, via an electrical connection 226, with at least one unit of the exhaust treatment system 200. In such embodiments, the ECU 508 may be located in any location of the engine compartment. The ECU 508 of one or more embodiments may be in electrical connection with at least one sensor proximate to the LNT 212 as described in FIGS. 6A-6C, below. In particular embodiments, the ECU 508 may be in electrical connection to sensor 220. In such embodiments, the ECU 508 connected to sensor 220 may provide a storage efficiency of the LNT 212.

In one or more embodiments, the exhaust treatment system 200 may include at least one sensor 220 that detects a concentration of CO, HCs, and $NO_x$ in the tailpipe emissions downstream of the particulate filter 206 and upstream of the oxidation catalytic unit 208. The concentration of CO in exhaust emissions downstream of the particulate filter and upstream of the oxidation catalytic unit 208 may be in a range of 0 to 35,000 ppm. The concentration of HCs in exhaust emissions downstream of the particulate filter 206 and upstream of the oxidation catalytic unit 208 may be in range of 0 to 7,500 ppm. The concentration of $NO_x$ in exhaust emissions downstream of the particulate filter 206 and upstream of the oxidation catalytic unit 208 may be in a range from about 0 to 2500 ppm, or in a range from about 0 to about 1000 ppm.

In one or more embodiments, the oxidation catalytic unit (or "oxidation catalyst") 208, the hydrogen injection unit 210, and the LNT 212 may be sequentially configured on the exhaust line 202 downstream of the particulate filter 206. The sequential configuration of the oxidation catalyst 208, the hydrogen injection unit 210, and the LNT 212 may be configured in a cold part 222 of the exhaust line 202. The cold part 222 of the exhaust line 202 may be a portion of the exhaust line 202 that operates under lower temperatures than the engine 201, the catalytic unit 204, and the particulate filter 206.

In one or more embodiments, an operation temperature of the oxidation catalyst 208 may be higher than an operation temperature of the LNT 212 and the hydrogen injection unit 210. For example, the operation temperature of the oxidation catalyst 208 may be at least 150° C. The operation temperature of LNT 212 such that $NO_x$ emissions are stored may be at least 20° C. as described in further detail below. The operation temperature of LNT 212 such that stored NOx emissions are reduced using the hydrogen injection unit 210 of one or more embodiments (i.e., regeneration of the LNT 212) is at least 60° C. as described herein. The operation temperatures as described herein may be detected by electronic systems of the engine, such as the sensor 220 or the ECU 508.

The oxidation catalyst 208 may be positioned proximate to the particulate filter 206 on the exhaust line such that the oxidation catalyst 208 is in fluid communication with the particulate filter 206. In such embodiments, the oxidation catalyst 208 is positioned downstream of the particulate filter 206 on the exhaust line 202 and upstream of the hydrogen injection unit 210.

The oxidation catalyst 208 of the cold part 222 of the exhaust treatment system 200 may react with CO, NO, and hydrocarbons of exhaust emissions such that $CO_2$, water ($H_2O$), $NO_2$, and $NO_3^-$ may be produced. Embodiments may include one or more oxidation catalysts 208 in fluid communication with particulate filter 206 on the exhaust line 202. In such embodiments, the oxidation catalyst 208 is in fluid communication with one or more LNTs 212 of the exhaust line 202. The oxidation catalyst 208 may include manganese dioxide ($MnO_2$) and may oxidize residual pollutant CO and NO into $CO_2$ and $NO_2$, respectively.

In one or more embodiments, the $MnO_2$ catalyst of the oxidation catalyst 208 is supported on monolith. A washcoat containing alumina may first be deposited on the support and dried. The support with the washcoat may then be impregnated with manganese salts (wet impregnation). Other metal transition salts may be added to improve the oxidation efficiency of an $MnO_2$ catalyst. For example, copper, nickel, iron or cerium salts may be used. Finally, a calcination under air flow is made at about 300° C. to about 500° C. to obtain the oxide forms. The $MnO_2$ catalyst may oxidize hydrocarbons into $CO_2$ and $H_2O$. More particularly, as illustrated in FIG. 2, an $MnO_2$ oxidation catalyst 208 may be placed after (i.e., downstream) the particulate filter 206 to help improve the conversion of pollutants into $CO_2$ (for hydrocarbons and CO) and $NO_2$ (for NO). Embodiments may include a surface-active oxygen (O*), which may react with residual pollutants of the tailpipe emissions according to the following Equations (Eqs. 1-4):

$$CO+O^* \rightarrow CO_2 \qquad \text{Eq. 1}$$

$$NO+O^* \rightarrow NO_2 \qquad \text{Eq. 2}$$

$$C_xH_y+2x+y/2O^* \rightarrow xCO_2+y/2H_2O \quad \text{Eq. 3}$$

$$2NH_3+7O^* \rightarrow 2NO_2+3H_2O \quad \text{Eq. 4}$$

The hydrogen injection unit 210 of the exhaust treatment system 200 may be configured downstream of the oxidation catalyst 208 and proximate to the LNT 212. The hydrogen injection unit may be located at an injection point 224 proximate to the LNT 212 to avoid thermal decomposition of hydrogen gas.

As shown in FIG. 2, the hydrogen injection unit 210 of the exhaust treatment system 200 includes a hydrogen source 216. The hydrogen source 216 provides a hydrogen gas to the exhaust line 202. The hydrogen gas may be injected through a hydrogen inlet line 218 to the exhaust line 202 at the injection point 224 upstream of the LNT 212. In such embodiments, the injection point 224 is directly proximate to the LNT 212. The injection point 224 may be a distance of between about 5 to about 10 times longer than a diameter of the exhaust line 202. In one or more embodiments, a mixing device may optionally be included in the exhaust line 202 upstream of the LNT 212 and downstream of the oxidation catalyst 208. In such embodiments, the mixing device may maximize the homogeneity of the mixture of exhaust gas and injected hydrogen gas.

In particular embodiments, the hydrogen inlet line 218 is in fluid communication with the LNT 212. The hydrogen source 216 may be a hydrogen tank configured within the hydrogen injection unit 210. In some embodiments, the hydrogen tank may be stored in a compartment of sufficient size of the exhaust treatment system 200.

In one or more embodiments, the hydrogen inlet line 218 may include a valve 506. The valve 506 may be operated by an electronic control unit (ECU) 508 to regulate an amount of hydrogen gas into the LNT 212. In addition, the valve 506 operated by the ECU 508 may regulate a flow rate of hydrogen gas.

FIG. 3A is a schematic of an exhaust treatment system 300 with a water-based hydrogen source in accordance with one or more embodiments disclosed herein. The exhaust treatment system 300 includes the sequential configuration of the exhaust line 202, the engine 201, the catalytic unit 204, the particulate filter 206, the sensor 220, and the oxidation catalyst 208 as described above. In addition, the hydrogen injection unit 210 of the exhaust treatment system 300 is positioned downstream of the oxidation catalyst 208 and upstream of the LNT 212 as described above. In such embodiments, the hydrogen injection unit 210 includes a water storage apparatus 306. The water storage apparatus 306 is in fluid communication 308 with an electrolyzer 310.

The electrolyzer 310 may have a power source 302 coupled to or positioned near the engine 201. The power source may include an electrical connection 304 to the electrolyzer 310. The electrolyzer 310 performs an electrolysis reaction of water from the water storage apparatus 306 according to Equation 4, below.

$$H_2O \rightarrow H_2+\tfrac{1}{2}O_2 \quad \text{Eq. 4}$$

In one or more embodiments, the electrolyzer 310 of the hydrogen injection unit 210 is in fluid communication with the hydrogen inlet line 218, such that a hydrogen gas generated from the electrolyzer 310 may be delivered to the exhaust line 202 via the hydrogen inlet line 218. In such embodiments, the hydrogen inlet line 218 may be configured proximate to the LNT 212.

In FIG. 3B, a hydrogen injection unit 210 of an exhaust treatment system 330 with an alternative water-based hydrogen source is shown in accordance with one or more embodiments of the present disclosure. The exhaust treatment system 330 includes the sequential configuration of the exhaust line 202, the engine 201, the catalytic unit 204, the particulate filter 206, the sensor 220, and the oxidation catalyst 208 as described above. A hydrogen injection unit 210 of the exhaust treatment system 330 is also configured downstream of the oxidation catalyst 208 and upstream of the LNT 212 as described above.

The exhaust treatment system 330 further includes a water condenser 320 on the exhaust line 202. The water condenser 320 may be downstream of the particulate filter 206 and upstream of the oxidation catalyst 208. The water condenser 320 condenses water from the gaseous phase to the liquid phase. In such embodiments, the water condenser 320 is in fluid communication with a water condensing line 322.

The water condensing line 322 transports liquid water from the water condenser 320 to a water storage apparatus 316. The water storage apparatus 316 is in fluid communication 318 with an electrolyzer 310. The electrolyzer 310 may have a power source 312 coupled to or positioned near the engine 201. The power source may include an electrical connection 314 to the electrolyzer 310. The electrolyzer 310 performs an electrolysis reaction of water from the water storage apparatus 316 as described above.

In one or more embodiments, the electrolyzer 310 of the hydrogen injection unit 210 is in fluid communication with the hydrogen inlet line 218, such that a hydrogen gas generated from the electrolyzer 310 may be delivered to the exhaust line 202 via the hydrogen inlet line 218. In such embodiments, the hydrogen inlet line 218 may be configured proximate to the LNT 212.

The LNT 212 of an exhaust treatment system of one or more embodiments may be located downstream of the oxidation catalyst 208 (FIG. 2) such that the location of the LNT 212 is proximate to a tailpipe 214. In such embodiments, the location of the LNT 212 may be proximate to the tailpipe 214 to reduce its temperature and maximize its $NO_x$ storage capacity. The LNT may be configured to operate, such that $NO_x$ emissions are stored, from about 20° C. to about 200° C., from about 25° C. to about 100° C., or from about 50° C. to 70° C. For example, $NO_x$ emissions may be stored on the LNT 212 at a temperature with a lower limit of one of 20° C., 30° C., 40° C., 50° C., 60° C., 70° C., 80° C., 100° C., 125° C. and 150° C. and an upper limit of one of 60° C., 70° C., 80° C., 100° C., 110° C., 120° C., 150° C., 175° C. and 200° C. where any lower limit pay be paired with any mathematically compatible upper limit.

Figure 4A:
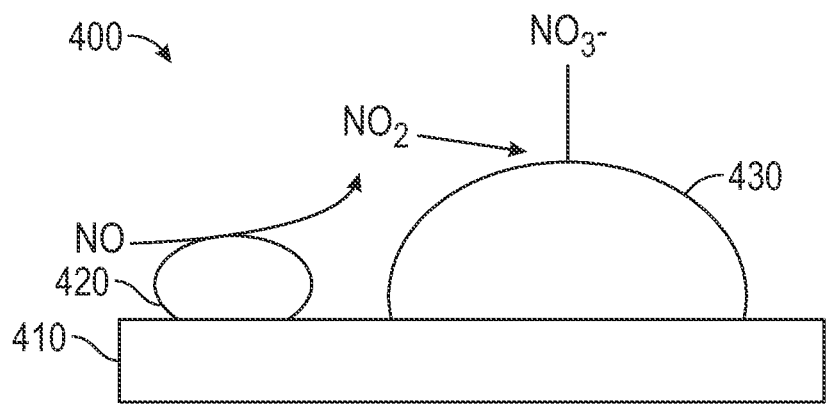
FIGS. 4A and 4B are schematic diagrams illustrating the use (FIG. 4A) and regeneration (FIG. 4B) of an LNT in accordance with one or more embodiments
Figure 4B:
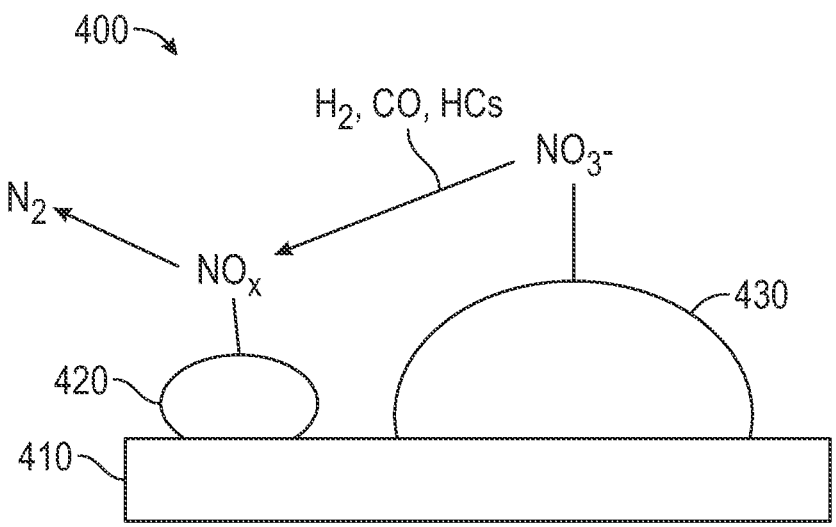

According to embodiments disclosed herein, an LNT configured downstream of the oxidation catalyst 208 on the exhaust line 202 is a $NO_x$ adsorber that reduces oxides of nitrogen emitted in the exhaust gas of an engine. As illustrated in FIGS. 4A and 4B, an LNT catalyst 400 may comprise a support area including a support material 410, such as alumina ($Al_2O_3$), on which is provided a storage material 430 comprising barium. The support material further includes a precious metal catalyst 420 comprising one or more precious metals from the platinum group and including, for example, platinum (Pt), palladium (Pd), and/or rhodium (Rh).

The LNT catalyst 400 is capable of adsorbing or storing $NO_2$ at temperatures of from about 20° C. to about 200° C. For example, $NO_x$ emissions may be stored on the LNT 212 at a temperature with a lower limit of one of 20° C., 30° C., 40° C., 50° C., 60° C., 70° C., 80° C., 100° C., 125° C. and 150° C. and an upper limit of one of 60° C., 70° C., 80° C., 100° C., 110° C., 120° C., 150° C., 175° C. and 200° C. where any lower limit may be paired with any mathematically compatible upper limit. According to the systems of the present disclosure, as illustrated in FIG. 4A, $NO_2$ from the oxidation of NO may then be adsorbed onto the LNT in the form of nitrates ($NO_3^-$).

As illustrated in FIG. 4B, during rich conditions where the LNT is rich in nitrates adsorbed onto the surface, the LNT may be regenerated by the injection of a hydrogen gas ($H_2$) from a hydrogen injection unit (e.g., 210, FIG. 2). Additionally, $H_2$, CO, or hydrocarbons that have not been oxidized by elements of the emission treatment system upstream of the LNT may reduce $NO_3^-$ formed from the adsorption of $NO_2$ onto the LNT catalyst into an inert gas, such as nitrogen gas ($N_2$).

In embodiments of the present disclosure, hydrogen gas injection assists the LNT 212 to reduce stored nitrate ($NO_3^-$) into nitrogen gas ($N_2$). In such embodiments, stored $NO_x$ emissions may be reduced at temperatures of from about 60° C. to about 200° C. For example, $NO_x$ emissions may be reduced from the LNT 212 to $N_2$ at a temperature with a lower limit of one of 60° C., 62° C., 65° C., 70° C., 75° C., 80° C., 90° C., 100° C., 125° C. and 150° C. and an upper limit of one of 70° C., 75° C., 80° C., 100° C., 110° C., 120° C., 150° C., 175° C. and 200° C. where any lower limit pay be paired with any mathematically compatible upper limit. In one or more embodiments of the present disclosure, reducing stored NOx emissions from the LNT may begin at a temperature of at least 60° C. In such embodiments, the reduction of $NO_2$ from the LNT 212 to $N_2$ with the injection of hydrogen gas includes a conversion efficiency of at least 80%. In some embodiments, the conversion efficiency may be at least 90%. In one or more particular embodiments, the conversion efficiency may be at least 95%. The conversion efficiency is a measure of NOx adsorbed on the LNT 212 reduced to $N_2$.

With the oxidation catalyst 208, the hydrogen injection unit 210, and the LNT 212 configured as described in embodiments of the present disclosure, the concentration of CO may be below 5,000 ppm located near the tailpipe 214. With the oxidation catalyst 208, the hydrogen injection unit 210, and the LNT 212 configured as described in embodiments of the present disclosure, the concentration of HCs may be below 2,500 ppm located near the tailpipe 214. With the oxidation catalyst 208, the hydrogen injection unit 210, and the LNT 212 configured as described in embodiments of the present disclosure, the concentration of $NO_x$ may be below 500 ppm located near the tailpipe 214.

As mentioned above, the LNT 212 may be located within the exhaust line 202 downstream of and in fluid communication with the oxidation catalyst 208 and the hydrogen injection unit 210 for the reduction of gaseous emissions. Hydrogen gas injection may be initiated via monitoring of at least one operating condition of the exhaust treatment system 200. In such embodiments, the monitoring of the at least one operating condition may include detecting a concentration of NOx emission.

Figure 5:
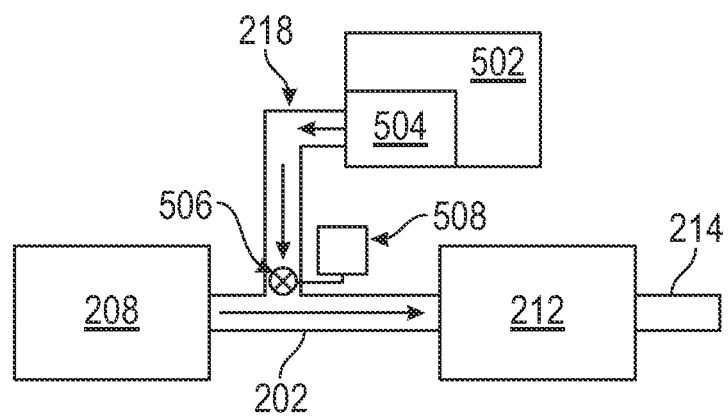
FIG. 5 is a schematic diagram a hydrogen injection unit in accordance with one or more embodiments.

As one skilled of the art may appreciate, any electronic device may be used to control the injection of hydrogen gas, such as a flow controller or an electronic control unit. As shown in FIG. 5, an electronic control unit (ECU) 508 may regulate operating conditions of the hydrogen injection unit, such as a rate of flow of the hydrogen gas. The flow rate of hydrogen gas may be directed from a hydrogen source 504 as described in embodiments above. The flow rate of hydrogen gas may be injected via fluid connection of the hydrogen inlet line 218 to the exhaust line 202. The injection of hydrogen gas upstream from and proximate to the LNT 212 may maintain low temperatures and avoid thermal decomposition of the hydrogen gas. The ECU 508 may regulate the flow rate of hydrogen gas via operation of a valve 506 on a hydrogen injection unit 502. The regulation of the flow rate of hydrogen gas may be dependent upon an exhaust mass flow. The exhaust mass flow may be defined by the amount of $NO_x$ to be reduced from the LNT 212 versus an LNT regeneration time. In such embodiments, the flow rate of hydrogen gas may be limited according to any relevant physical parameter, such as temperature, LNT aging, and combinations thereof. In particular embodiments, the ECU 508 may activate hydrogen injection at regular intervals to avoid NOx leakage. In such embodiments, hydrogen gas may be over-consumed.

Figure 6A:
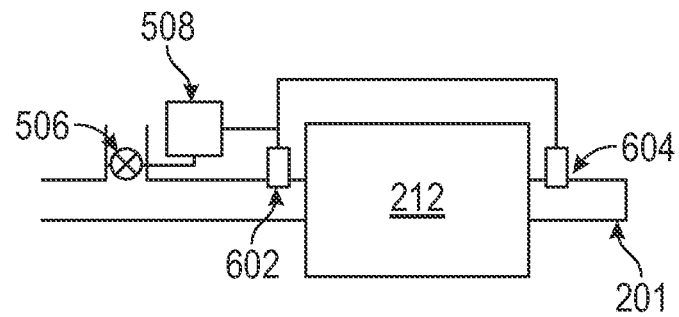
FIGS. 6A-6C are schematic diagrams of sensor locations for sensing LNT storage efficiency in accordance with one or more embodiments.
Figure 6B:
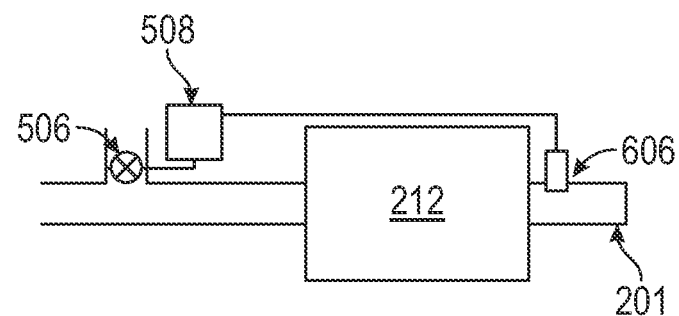
Figure 6C:
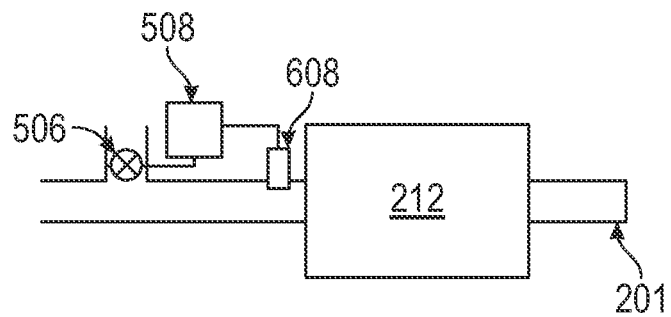

In one or more embodiments, the ECU 508 may be in communication with at least one sensor as shown in FIG. 6A-6C. In such embodiments, the at least one sensor may be located proximate to the LNT 212. As one of ordinary skill in the art may appreciate, the at least one sensor may be a $NO_x$ sensor. The $NO_x$ sensor may be able to detect a sum of $NO_x$ and ammonia ($NH_3$). In one or more embodiments of the present disclosure, ammonia may be oxidized to $NO_2$ by the oxidation catalyst 208. As such, the at least one sensor may relate a sum of $NO_x$ emissions to the ECU 508. In such embodiments, the storage capacity of the LNT 212 may be estimated via ECU 508 calibration to a known value of LNT storage capacity.

In one or more embodiments, the at least one $NO_x$ sensors may detect a $NO_x$ concentration in emissions of the exhaust line 202 as described in FIGS. 6A-6C. The detected $NO_x$ concentration may be provided by the at least one $NO_x$ sensor to the ECU 508. In such embodiments, the ECU 508 may convert the detected $NO_x$ concentration into an instantaneous mass flow of $NO_x$ using a known exhaust mass flow rate. The ECU 508 may have the known exhaust mass flow programmed within the unit. The ECU 508 may derive a total stored quantity of NOx emissions on the LNT 212 from a calculated stored quantity and a calculated storage efficiency as described below.

In one or more embodiments, the at least one sensor may relate a sum of $NO_x$ emissions to the ECU 508. The ECU may derive a storage efficiency of the LNT from the sum of $NO_x$ emissions. The storage efficiency (SE) may be derived using Equation 5.

$$SE(\%) = \left(1 - \frac{NO_{2_{out}}}{NO_{2_{in}}}\right) \times 100 \qquad \text{Eq. 5}$$

where $NO_{2_{out}}$ relates to the amount of $NO_2$ emissions released from the tailpipe 214 and $NO_{2_{in}}$ relates to the amount of $NO_2$ emissions of the exhaust line 202 downstream of the oxidation catalyst 208 and upstream of the LNT 212. The at least one sensor may be configured to measure $NO_2$ during a storage phase. The term "storage phase" may relate to a phase of LNT 212 operation that involves $NO_x$ storage on the LNT 212 from the exhaust line 202.

In one or more embodiments, the ECU 508 may control the opening and closing of valve 506 on the hydrogen inlet line 218 based on $NO_x$ emission concentration transmitted by the at least one sensor. In such embodiments, the reduction of $NO_2$ from the LNT into $N_2$ includes a reduction rate of at least 80% conversion efficiency. In some embodiments, the conversion efficiency may be at least 90%. In one or more particular embodiments, the conversion efficiency may be at least 95%. The conversion efficiency is a measure of $NO_x$ adsorbed on the LNT 212 reduced to $N_2$. In order to maximize regeneration efficiency of the LNT, a flow of hydrogen gas may be limited according to any relevant physical parameter, such as local temperature, age of LNT 212, or combinations thereof.

In one or more particular embodiments, two sensors may be included in the exhaust treatment system as shown in FIG. 6A. In such embodiments, a first sensor 602 may be placed upstream of the LNT 212 and downstream of the hydrogen inlet line 218, and a second sensor 604 may be placed downstream of the LNT 212 to estimate the LNT storage efficiency. In such embodiments, the sensors may be placed in locations proximate to the LNT to detect a concentration of $NO_x$ emissions of the exhaust line 202.

In one or more embodiments, hydrogen gas injection may be performed upon indication of a predetermined limit of the LNT 212 storage efficiency via actuation of the valve 506 of the hydrogen inlet line 218 from the ECU 508. The indication of LNT storage efficiency may be transmitted via at least one signal to the ECU 508 from first and second sensors 602 and 604. In such embodiments, the first and second sensors 602 and 604 may transmit a signal relating to the detection of a predetermined concentration of $NO_x$ emissions.

In such embodiments, the first sensor 602 may detect $NO_x$ in an amount of 0 ppm to about 2500 ppm in emissions upstream of the LNT 212. The second sensor 604 may detect $NO_x$ in an amount of about 0 ppm to about 250 ppm when the LNT has achieved about 90% storage efficiency in emissions from the LNT 212. The second sensor 604 may detect NOx in an amount up to 2500 ppm if the LNT is 100% saturated in emissions from the LNT 212. The storage efficiency may then be calculated using Equation 5 above. In such embodiments, the ECU may derive an integrated stored quantity of $NO_x$ emissions of the LNT as described above.

For example, when the storage efficiency reaches a value of at least 70%, the LNT 212 may be approaching $NO_x$ storage saturation. In such cases, an amount of hydrogen may be injected, $NO_x$ stored on the LNT 212 may be reduced, and the LNT 212 may be regenerated to store further emissions of $NO_x$.

The ECU 508 may control an amount of hydrogen gas released from the hydrogen injection unit 210 that may be a sufficient amount to reduce the $NO_2$ stored on the LNT 212. In such embodiments, a hydrogen source 504 of the hydrogen injection unit 502 may be a hydrogen tank as previously described. The amount of hydrogen gas injected from the hydrogen source 504 to the exhaust line 202 may be controlled via actuation of the valve 506. The amount of hydrogen may then be directed to the exhaust line 202 via the hydrogen inlet line 218 and the valve 506. The ECU 508 may operate the valve 506 such that the valve 506 is partially opened, fully opened, or fully closed. In such embodiments, the LNT 212 may be regenerated after the $NO_2$ is reduced to $N_2$.

In one or more embodiments, the hydrogen injection unit 502 may include a water storage system and an electrolyzer (as presented in FIGS. 3A and 3B) for the hydrogen source 504. The ECU 508 may control the operating conditions of the hydrogen source 504, such as an activation of the electrolysis of water according to Equation 4, to yield an amount of hydrogen gas. The amount of hydrogen gas generated by the electrolysis of water may be a sufficient amount to reduce the $NO_2$ stored on the LNT 212.

The hydrogen gas generated from electrolysis may then be directed to the exhaust line 202 via the hydrogen inlet line 218 and the valve 506. The ECU 508 may then operate the valve 506 to control the amount of hydrogen gas to the exhaust line 202. The ECU 508 may operate the valve to be partially opened, fully opened, or fully closed. In such embodiments, the LNT 212 may be regenerated after the $NO_2$ is reduced to $N_2$.

With reference to FIG. 6B, a sensor 606 may be positioned downstream of the LNT 212 on the exhaust line 202 to relate the storage capacity of the LNT 212. The ECU 508 may actuate the valve 506 of the hydrogen inlet line 218 such that the release of hydrogen gas from the hydrogen inlet line 218 is performed based on information transmitted by sensor 606.

For example, when the sensor 606 measures a concentration of $NO_x$ emissions downstream of the LNT 212, the storage capacity of the LNT 212 is low. In such embodiments, a storage capacity of the LNT 212 may be known. Sensor 606 may detect an amount of $NO_x$, indicating the LNT 212 has achieved the known storage capacity. The sensor 606 may detect an amount of $NO_x$ relating to at least 70% storage efficiency of the LNT 212. As such, the at least 70% storage efficiency of the LNT 212 may directly relate to an instantaneous quantity of stored $NO_x$ emissions on the LNT 212 to be reduced. In such embodiments, the detection of the at least 70% storage efficiency may activate the injection of hydrogen gas as described in embodiments above. to In accordance with one or more embodiments, as shown in FIG. 6C, a sensor 608 may be placed upstream of the LNT 212 and downstream of the hydrogen inlet line 218. Similar to the embodiment described in FIG. 6B, the ECU 508 may actuate the valve 506 of the hydrogen inlet line 218 based on an estimation of storage capacity of the LNT 212 by the sensor 608. The hydrogen gas may be injected when the sensor 608 estimates that the LNT 212 is at or near the storage capacity of stored $NO_2$. In such embodiments, the ECU 508 may estimate when the LNT 212 has reached storage capacity via integration of the NOx emissions measured by the sensor 608 and the known value of the storage capacity of the LNT 212.

The exhaust treatment system of one or more embodiments may not include the at least one sensor proximate to the LNT 212. In such embodiments, hydrogen injection may be activated at regular intervals to provide a regular amount of hydrogen gas to the LNT 212 to avoid $NO_x$ leakage from the LNT 212. In such embodiments, an over-consumption of hydrogen gas may be utilized in a manner that provides a decrease in resource efficiency.

Embodiments of the exhaust treatment system of the present disclosure may be configured onboard a transport vehicle. The transport vehicle includes any engine and an exhaust treatment system as described in embodiments above. The transport vehicle may further include a passenger compartment. In such embodiments, the hydrogen injection unit may be configured such that the hydrogen source may be included onboard a transport vehicle. The hydrogen injection unit may be configured in a compartment of the transport vehicle where it may be convenient regarding space and filling operations. For example, the hydrogen injection unit may be stored in an engine compartment, under the transport vehicle, or in a trunk of the transport vehicle.

As a person of ordinary skill of the art may appreciate, a hydrogen tank or a water tank of a hydrogen injection unit of one or more embodiments may be replaceable or refillable. In one or more embodiments, the hydrogen tank may be refilled or replaced during oil maintenance of a transport vehicle, such as from 15 kkm (kilokilometers) to 25 kkm of the engine travel distance. In other embodiments, the hydrogen tank may be refilled during a fuel refilling phase of the transport vehicle, such as from 400 km to 600 km, according to a specified hydrogen tank volume and hydrogen gas consumption necessary for operation of $NO_x$ reduction and LNT regeneration, as discussed above.

Method of Operation Exhaust System

Methods in accordance with one or more embodiments of the present disclosure may be used to treat residual pollutants comprising NO, CO, and hydrocarbons from tailpipe emissions in an exhaust line.

Figure 7:
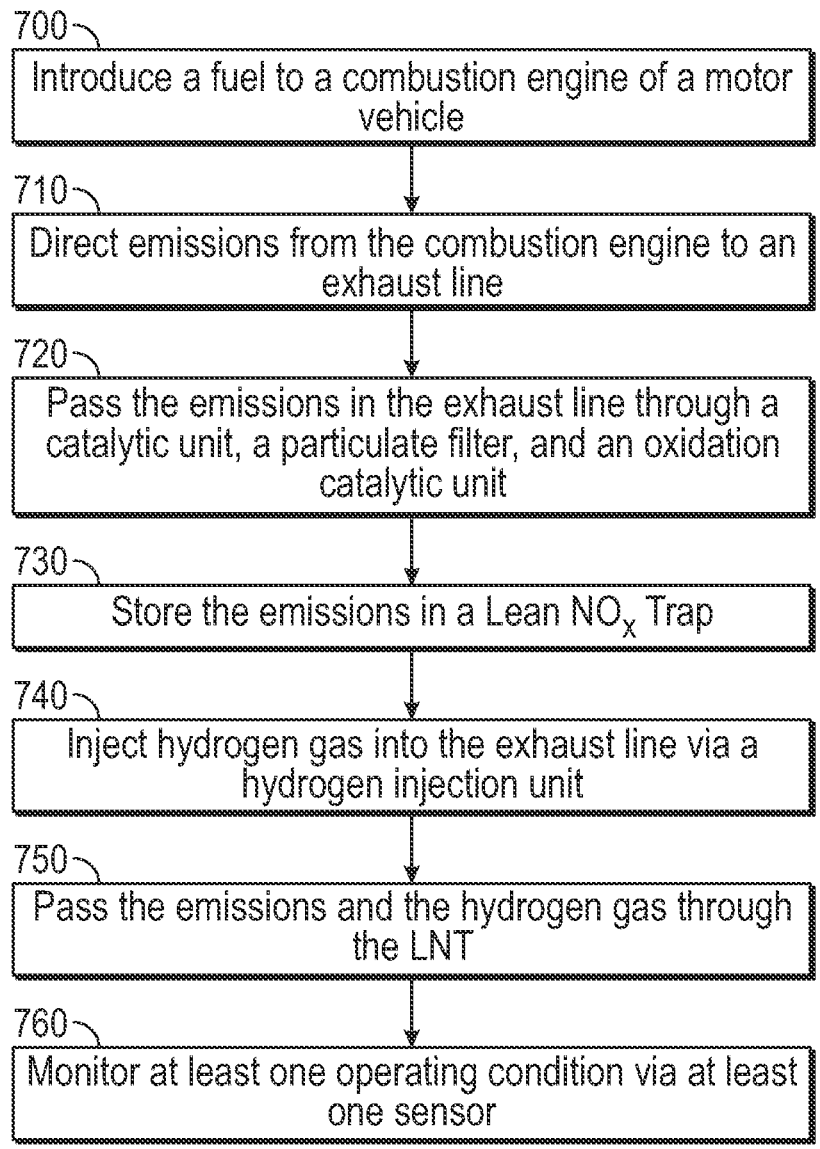
FIG. 7 is a flowchart of a method for reducing the content of NOx in an exhaust line carrying engine emissions in accordance with one or more embodiments.

A method in accordance with one or more embodiments of the present disclosure is shown in FIG. 7. Shown at 700, the method includes introducing a fuel to a combustion engine of a motor vehicle. Emissions are produced from the combustion of the fuel. Shown at 710, the method includes directing emissions, such as $NO_x$, CO, and hydrocarbons, from the combustion engine to an exhaust line (e.g., 202, FIG. 2). An exhaust treatment system (200 FIG. 2, 300 FIG. 3A, or 330 FIG. 3B) is included on the exhaust line as described in embodiments above.

As shown at 720, the method includes passing the emissions in the exhaust line 202 through a catalytic unit 204, a particulate filter 206, and an oxidation catalytic unit (or "oxidation catalyst") 208 (FIG. 2). As previously described the catalytic unit 204 may perform a redox reaction of the first emission mixture. The particulate filter 206 may filter out solid components from the first emission mixture. The oxidation catalyst 208 may further oxidize emissions as described above.

As shown at 730, the method further includes adsorbing or storing the emissions, such as $NO_x$ emissions, in a Lean $NO_x$ Trap (LNT) 212, wherein the LNT 212 is configured downstream of the oxidation catalyst 208. In such embodiments, $NO_x$ emissions that remain in the exhaust line (e.g., 202, FIG. 2) may be further oxidized and stored as $NO_3^-$ -on the LNT 212. The $NO_x$ emissions may be stored on the LNT 212 at a temperature with a lower limit of one of 20° C., 30° C., 40° C., 50° C., 60° C., 70° C., 80° C., 100° C., 125° C. and 150° C. and an upper limit of one of 60° C., 70° C., 80° C., 100° C., 110° C., 120° C., 150° C., 175° C. and 200° C. where any lower limit pay be paired with any mathematically compatible upper limit.

The LNT 212 may have a storage efficiency of at least about 70%. As one skilled in the art may appreciate, $NO_2$ storage is more efficient when the storage material comprises a barium oxide (BaO) content from 15 to 25 wt % (weight percent). In addition, 0.5 to 1 wt % of PGM may be sufficient for nitrites reduction or pollutant conversion at high temperatures, such as temperatures of about 250 to 300° C. The $NO_2$ storage may be about 30 to about 60 mg/g of the barium oxide (BaO) from about 20° C. to about 200° C. as previously described.

As shown at 740, the method further includes injecting hydrogen gas into the exhaust line via a hydrogen injection unit 210 as described in embodiments above. In such embodiments, the hydrogen gas may be injected through a hydrogen inlet line 218 upstream of and proximate to the LNT 212.

As shown at 750, the method includes passing the emissions and the hydrogen gas through the LNT 212. In such embodiments, passing the emissions and the hydrogen gas through the LNT 212 includes the reduction of $NO_x$ from the LNT into $N_2$. The reduction of $NO_x$ from the LNT 212 into $N_2$ may achieve a conversion efficiency of at least 80%. In some embodiments, the conversion efficiency may be at least 90%. In one or more particular embodiments, the conversion efficiency may be at least 95%. In order to maximize conversion efficiency of the LNT 212, a flow of hydrogen gas may be limited according to any relevant physical parameter, such as temperature, age of LNT, or combinations thereof.

Additionally, as shown at 760, the method may include monitoring at least one operating condition via at least one sensor. The at least one sensor may be in electrical communication with an ECU as described above. The at least one sensor of may monitor an operating condition such as the concentration of $NO_x$ of the emissions of exhaust line 202 as described by FIGS. 6A-6C above. The at least one sensor may monitor the concentration of $NO_x$ of the emissions of exhaust line 202 upstream of the LNT 212, downstream of the LNT 212, and combinations thereof.

Embodiments of the present disclosure may provide at least one of the following advantages. Systems and methods in accordance with the present disclosure may provide improved reduction of exhaust emissions from combustion engines, such as reduction of $NO_x$, CO, and hydrocarbons. In addition, ammonia ($NH_3$) production and emission are directly linked to hydrogen gas concentration of the exhaust line upstream to the LNT. The non-limiting embodiments of the present disclosure may reduce production of $NH_3$, and thereby emission of $NH_3$, through selective control of hydrogen injection.

Example

Materials and Methods

A traditional synthetic gas bench (SGB) device to mix bottles of gas in a laboratory and a miniaturized LNT was employed in the following experiments. Tanks of nitrogen dioxide ($NO_2$), nitrogen ($N_2$), and hydrogen ($H_2$) were purchased from Air Products (Aubervilliers, France).

The SGB device was used to mix desired gases ($NO_2$ and $N_2$) and inject the mixture into a reactor containing the LNT. The temperature was ramped using Temperature Programmed Desorption (TPD) from ambient temperature (20° C.) to about 400° C. The TPD was performed at a ramp rate of 10° C./min, and the flow rate for gases were designated to 4 L/min (Liters per minute). A Fourier Transform (FTIR) analyzer, such as a Multi-gas Infra-Red Fourier Transform (FTIR) Analyzer (ENVEA, Poissy, France), was used to analyze emitted gases.

Conversion efficiencies (CE) were calculated using Equation 6 as follows:

$$CE(\%) = \left(1 - \frac{NH_{3\,produced} + NO_{desorbed} + NO_{2\,desorbed}}{NO_{2\,adsorbed}}\right) \times 100 \qquad \text{Eq. 6}$$

Results

TABLE 1

Measured Conversion Efficiencies of Benchtop LNT

| Trial Number | Quantities (mmol/g of catalyst) | | | | Conversion Efficiency (%) |
| --- | --- | --- | --- | --- | --- |
| | $NO_2$ absorbed | $NH_3$ produced | NO desorbed | $NO_2$ desorbed | |
| Test 1 | 0.87 | 0 | 0.03 | 0.01 | 95 |
| Test 2 | 0.79 | 0.12 | 0.001 | 0.002 | 84 |
| Test 3 | 0.76 | 0.09 | 0 | 0.002 | 88 |

As shown in Table 1, the reduction of nitrogen oxide compounds is approximately 80%, and the production of ammonia is limited. It was also observed that the LNT regeneration and reduction of NO₂ began when the temperature reached approximately 60° C. Consequently, H₂ may be used at such temperatures to perform reduction of NO₂ and LNT regeneration.

Although only a few example embodiments have been described in detail above, those skilled in the art will readily appreciate that many modifications are possible in the example embodiments without materially departing from this invention. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures. It is the express intention of the applicant not to invoke 35 U.S.C. § 112(f) for any limitations of any of the claims herein, except for those in which the claim expressly uses the words 'means for' together with an associated function.

What is claimed:

1. An exhaust treatment system comprising:
    an exhaust line;
    a series of emission treatment units in the exhaust line, wherein the series of emission treatment units comprises:
        a catalytic unit downstream of an engine;
        a particulate filter unit downstream of the catalytic unit;
        an oxidation catalytic unit downstream of the particulate filter unit;
        a hydrogen injection unit downstream of the oxidation catalytic unit, wherein the hydrogen injection unit is configured to inject a gas consisting essentially of hydrogen gas (H₂) into the exhaust line; and
        a Lean NO$_x$ Trap (LNT) for trapping at least one gaseous emission downstream of the hydrogen injection unit,
        wherein the LNT is located in a cold part of the exhaust line that operates at a temperature less than a temperature of the engine, the catalytic unit, the particulate filter, or any combination thereof;
    an electronic control unit, wherein the electronic control unit is in electrical communication with at least one emission treatment unit; and
    at least one sensor proximate the LNT and in electrical communication with the electronic control unit,
        wherein the at least one sensor is coupled to the exhaust line upstream of the LNT, downstream of the LNT, or combinations thereof, wherein the at least one sensor is configured to acquire a concentration of NO$_x$ emissions upstream of the LNT, downstream of the LNT or combinations thereof; and
        wherein the electronic control unit calculates a storage efficiency of the LNT.

2. The exhaust treatment system of claim 1, wherein the hydrogen injection unit comprises a hydrogen source and a hydrogen inlet line in fluid communication with the exhaust line,
    wherein the hydrogen inlet line flows hydrogen gas (H₂) from the hydrogen source to the exhaust line upstream of the LNT; and
    the hydrogen inlet line has an injection point directly proximate to the LNT.

3. The hydrogen injection unit of claim 2, wherein the hydrogen source comprises a hydrogen tank, a water tank in fluid communication with an electrolyzer, a condenser of the exhaust treatment system in fluid communication with a water tank and an electrolyzer, or combinations thereof.

4. The exhaust treatment system of claim 1, wherein the hydrogen injection unit comprises a source of hydrogen coupled to a hydrogen inlet line in selective fluid communication with the exhaust line upstream of the LNT.

5. The exhaust treatment system of claim 1, wherein the at least one emission treatment unit is in electrical communication with the hydrogen injection unit and the LNT,
    wherein the hydrogen injection unit comprises at least one valve, the electronic control unit operates the at least one valve, and the electronic control unit is in communication with the at least one sensor; and
    wherein the electronic control unit controls an amount of the hydrogen gas injected into the exhaust line from the hydrogen injection unit.

6. The exhaust treatment system of claim 1, wherein the LNT is configured to trap NO$_x$ emissions of nitrogen oxide, nitrogen dioxide, or combinations thereof.

7. The exhaust treatment system of claim 6, wherein the LNT comprises:
    a support area comprising alumina;
    a compound for trapping nitrogen oxide, nitrogen dioxide, or combinations thereof; and
    at least one precious metal catalyst for oxidation of nitrogen oxide (NO), nitrogen dioxide (NO₂), or combinations thereof (NO$_x$) in an excess of oxygen, wherein the at least one precious metal catalyst reduces the NO$_x$ to store in an oxygen poor environment.

8. The exhaust treatment system of claim 6, wherein the LNT is configured to receive an amount of the hydrogen gas injected from a hydrogen inlet line to reduce the trapped NO$_x$ emissions in the LNT to an inert gas.

9. A transport vehicle comprising:
    a passenger compartment;
    an engine; and
    the exhaust treatment system of claim 1.

10. The exhaust treatment system of claim 1, wherein the hydrogen injection unit comprises a hydrogen source, wherein the hydrogen source is a hydrogen tank.

11. The exhaust treatment system of claim 1, wherein the hydrogen injection unit comprises a hydrogen source, wherein the hydrogen source is a water tank in fluid communication with an electrolyzer.

12. A method of operating an exhaust treatment system, the method comprising:
    introducing a fuel to a combustion engine of a motor vehicle;
    directing emissions from the combustion engine to an exhaust line;
    passing the emissions in the exhaust line through a catalytic unit, a particulate filter, and an oxidation catalytic unit;
    storing the emissions in a Lean NO$_x$ Trap (LNT), wherein the LNT is positioned downstream of the oxidation catalytic unit and proximate to a tailpipe of the exhaust line, and operating the LNT at a temperature less than an operation temperature of the engine, the catalytic unit, the particulate filter, or any combination thereof;
    injecting a gas consisting essentially of hydrogen gas (H₂) into the exhaust line via a hydrogen injection unit, wherein an amount of the gas injected from a hydrogen inlet line reduces the trapped NOx emissions in the LNT to an inert gas, wherein the inert gas is nitrogen;

controlling the injecting the gas consisting essentially of hydrogen gas (H) into the exhaust line using an electronic control unit of the hydrogen injection unit, wherein the controlling comprises:
  transmitting a signal from at least one sensor of the exhaust line to the electronic control unit, wherein the at least one sensor is proximate to the LNT on the exhaust line, and wherein the at least one sensor acquires a concentration of $NO_x$ emissions upstream of the LNT, downstream of the LNT or combinations thereof;
  calculating a storage efficiency of the LNT based on the transmitted signal; and
  adjusting a valve of the hydrogen injection unit, wherein the valve is located in a hydrogen inlet line between the hydrogen injection unit and the LNT; and
passing the emissions and the gas consisting essentially of hydrogen gas ($H_2$) through the LNT.

13. The method of claim 12, wherein the emissions stored in the LNT comprise oxides of nitrogen ($NO_x$), wherein the nitrogen oxides are nitrogen oxide, nitrogen dioxide, or combinations thereof.

14. The method of claim 12, wherein the injecting the gas consisting essentially of hydrogen gas ($H_2$) into the exhaust line via the hydrogen injection unit comprises providing the hydrogen injection unit with a hydrogen source in fluid communication with the exhaust line.

15. The method of claim 14, wherein the providing the hydrogen injection unit with a hydrogen source comprises storing a hydrogen tank, wherein the hydrogen source may be stored onboard a transport vehicle.

16. The method of claim 14, wherein the providing the hydrogen injection unit with a hydrogen source comprises condensing water from the exhaust line and flowing the water to a water tank connected to an electrolyzer within the hydrogen injection unit.

17. The method of claim 12, wherein the signal transmitted from the at least one sensor to the electronic control unit comprises a signal representative of the acquired concentration of $NO_x$ emissions from the exhaust line.

18. The method of claim 12, wherein the passing the emissions and the gas consisting essentially of hydrogen gas ($H_2$) through the LNT further comprises:
  reducing the stored emissions from the LNT to an inert gas, wherein the inert gas is nitrogen ($N_2$);
  releasing the inert gas into the exhaust line; and
  regenerating the LNT.

19. The method of claim 18, wherein the reducing the stored emissions from the LNT to an inert gas comprises a conversion efficiency of at least 80%.

20. The method of claim 19, wherein the conversion efficiency is at least 95%.

* * * * *